(12) United States Patent
Nyamwange et al.

(10) Patent No.: US 12,250,225 B2
(45) Date of Patent: Mar. 11, 2025

(54) SYSTEM AND METHOD FOR THE VALIDATION OF ELECTRONIC DATA TRANSFERS IN A DISTRIBUTED NETWORK VIA SELF-DIRECTED IMAGE DATA

(71) Applicant: BANK OF AMERICA CORPORATION, Charlotte, NC (US)

(72) Inventors: Elvis Nyamwange, Little Elm, TX (US); Amer Ali, Jersey City, NJ (US); Erik Dahl, Newark, DE (US); Pratap Dande, Saint Johns, FL (US); Brian Neal Jacobson, Los Angeles, CA (US); Rahul Shashidhar Phadnis, Charlotte, NC (US); Sailesh Vezzu, Hillsborough, NJ (US); Hari Vuppala, Charlotte, NC (US); Rahul Yaksh, Austin, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 91 days.

(21) Appl. No.: 18/223,178

(22) Filed: Jul. 18, 2023

(65) Prior Publication Data
US 2025/0030697 A1  Jan. 23, 2025

(51) Int. Cl.
*H04L 9/40* (2022.01)
*H04L 67/1097* (2022.01)
*H04L 67/52* (2022.01)

(52) U.S. Cl.
CPC ........ *H04L 63/105* (2013.01); *H04L 67/1097* (2013.01); *H04L 67/52* (2022.05)

(58) Field of Classification Search
CPC ...... H04L 7/1097; H04L 63/105; H04L 67/52
See application file for complete search history.

(56) References Cited

U.S. PATENT DOCUMENTS

| | | |
|---|---|---|
| 8,700,530 B2 | 4/2014 | Smith |
| 8,751,379 B1 | 6/2014 | Bueche, Jr. |
| 10,776,784 B2 | 9/2020 | Buhrmann et al. |
| 10,867,292 B2 | 12/2020 | Lin et al. |
| 11,068,901 B2 | 7/2021 | Henry et al. |
| 11,080,681 B1 | 8/2021 | Zettner |
| 2007/0255620 A1 | 11/2007 | Tumminaro et al. |
| 2011/0276484 A1 | 11/2011 | Pearson et al. |
| 2013/0060708 A1 | 3/2013 | Oskolkov et al. |

(Continued)

*Primary Examiner* — Jonathan A Bui
(74) *Attorney, Agent, or Firm* — Moore & Van Allen PLLC; Andrew T. Wood

(57) ABSTRACT

Systems, computer program products, and methods are described herein for validation of electronic data transfers in a distributed network via self-directed image data. The present invention is configured to receive a request for a transfer of electronic data from a first repository associated with a first user to a second repository associated with a second user, transfer the electronic data, generate and apply a first identifier to the electronic data, collect a geolocation of a second endpoint device, transmit the geolocation and a request for a verification of the geolocation to the first endpoint device, receive the verification of the geolocation, generate and apply a second identifier to the electronic data, transmit control signals to the second endpoint device to prompt collection of self-directed image data, and collect, using the second endpoint device, the self-directed image data.

20 Claims, 6 Drawing Sheets

(56) References Cited

U.S. PATENT DOCUMENTS

| | | |
|---|---|---|
| 2013/0144734 A1 | 6/2013 | Perkins et al. |
| 2014/0058928 A1 | 2/2014 | Cornforth et al. |
| 2017/0200143 A1 | 7/2017 | Rolf |
| 2018/0338231 A1* | 11/2018 | Johnson ................ G06V 40/172 |
| 2020/0104876 A1* | 4/2020 | Chintakindi ........... A61B 5/024 |
| 2021/0328981 A1* | 10/2021 | Cuan ...................... G06Q 20/34 |
| 2022/0405737 A1 | 12/2022 | Mccauley et al. |
| 2023/0177486 A1 | 6/2023 | Koeppel |
| 2023/0230088 A1 | 7/2023 | Abreu et al. |
| 2024/0289718 A1* | 8/2024 | Eayrs ................. G06Q 10/0633 |

* cited by examiner

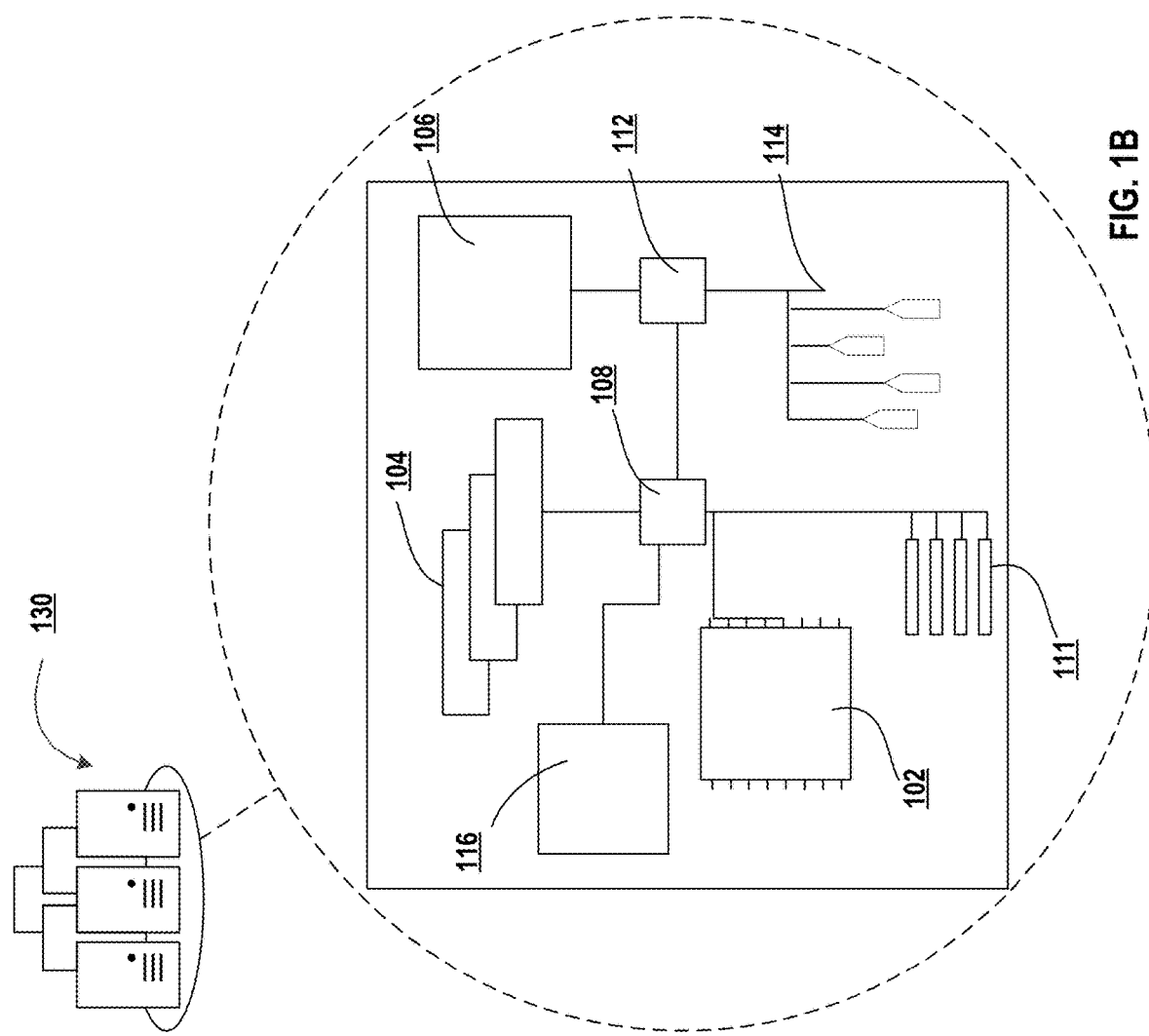

SYSTEM AND METHOD FOR THE VALIDATION OF ELECTRONIC DATA TRANSFERS IN A DISTRIBUTED NETWORK VIA SELF-DIRECTED IMAGE DATA

FIELD OF THE INVENTION

The present invention embraces a system for validation of electronic data transfers in a distributed network via self-directed image data.

BACKGROUND

In the current landscape of electronic data transfers, one of the pressing challenges is inadvertent electronic data transfers to repositories via endpoint devices. Generally, when an electronic data transfer is requested, the system requests information from the sending device regarding the receiving device, such as an email address or telephone number. However, such information may sometimes lead to inadvertent electronic data transfers, as phone numbers and email addresses may often be associated with multiple devices and repositories. Thus, to effectively address this issue, there is a need for a system and method for validation of electronic data transfers in a distributed network via self-directed image data. By implementing such a solution, organizations can ensure the integrity and security of electronic data transfers between devices, such that electronic data transfers are intentional as to the destination, and accurate as to the electronic data itself.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for validation of electronic data transfers in a distributed network via self-directed image data is presented. The system may include a processing device, and a non-transitory storage device comprising instructions that, when executed by the processing device, causes the processing device to perform the steps of: receive, using a first endpoint device, a first request for a transfer of electronic data from a first repository associated with a first user to a second repository associated with a second user, wherein the first request comprises an amount of the transfer of the electronic data and details of the second repository associated with the second user, transfer the electronic data from the first repository to an intermediary, generate and apply a first identifier to the electronic data, collect, a geolocation of a second endpoint device, wherein the second endpoint device is associated with the second repository, and wherein the geolocation is collected by a global positioning unit of the second endpoint device, transmit the geolocation of the second endpoint device and a request for a verification of the geolocation of the second endpoint device to the first endpoint device, receive, using the first endpoint device, the verification of the geolocation of the second endpoint device, generate and apply, as a result of the verification of the geolocation of the second endpoint device, a second identifier to the electronic data, transmit control signals to the second endpoint device to prompt collection of self-directed image data, collect, using the second endpoint device, the self-directed image data, wherein the self-directed image data comprises a timestamp, and store, temporarily, the self-directed image data in a database.

In some embodiments, executing the instructions further causes the processing device to perform the steps of: determine, using a quality assurance engine, a quality of the self-directed image data, generate and apply, as a result of the quality of the self-directed image data, a third identifier to the electronic data, and transmit control signals to the second endpoint device to display a notification of the quality of the self-directed image data, wherein the notification comprises a rejection when the quality of the self-directed image data is deficient and control signals to prompt collection of a second self-directed image data, and wherein the notification comprises a confirmation when the quality of the self-directed image data is deficient.

In some embodiments, executing the instructions further causes the processing device to perform the steps of: transmit the self-directed image data to the first endpoint device, display the self-directed image data on the first endpoint device, transmit, to the first endpoint device, a request for a first disposition, and receive, using the first endpoint device, the first disposition.

In some embodiments, when the first disposition comprises an affirmation of the self-directed image data, the electronic data is transferred from the intermediary to the second repository.

In some embodiments, when the first disposition comprises a rejection of the self-directed image data, the electronic data is transferred from the intermediary to the first repository.

In some embodiments, executing the instructions further causes the processing device to perform the steps of: receive, using the first endpoint device, a request to modify the transfer of the electronic data, and transmit the electronic data from the intermediary to the first repository.

In some embodiments, executing the instructions further causes the processing device to perform the steps of: receive, using the first endpoint device, a second request for the transfer of electronic data from the first repository to the second repository, wherein when compared to the first request, the second request comprises differences of at least one selected from the group consisting of (1) the amount of the transfer of the electronic data and (2) details of the second repository associated with the second user.

In another aspect, a computer program product for validation of electronic data transfers in a distributed network via self-directed image data is presented. The computer program product may include a non-transitory computer-readable medium including code causing an apparatus to receive, using a first endpoint device, a first request for a transfer of electronic data from a first repository associated with a first user to a second repository associated with a second user, wherein the first request comprises an amount of the transfer of the electronic data and details of the second repository associated with the second user, transfer the electronic data from the first repository to an intermediary, generate and apply a first identifier to the electronic data, collect, a geolocation of a second endpoint device, wherein the second endpoint device is associated with the second repository, and wherein the geolocation is collected by a global positioning unit of the second endpoint device, transmit the geolocation of the second endpoint device and a request for a verification of the geolocation of the second endpoint device to the first endpoint device, receive, using the first endpoint device, the verification of the geolocation of the second endpoint device, generate and apply, as a result of the verification of the geolocation of the second endpoint device, a second identifier to the electronic data, transmit control signals to the second endpoint device to prompt collection of self-directed image data, collect, using the second endpoint device, the self-directed image data, wherein the self-directed image data comprises a timestamp, and store, temporarily, the self-directed image data in a database.

In yet another aspect, a method for validation of electronic data transfers in a distributed network via self-directed image data is presented. The method may include receiving, using a first endpoint device, a first request for a transfer of electronic data from a first repository associated with a first user to a second repository associated with a second user, wherein the first request comprises an amount of the transfer of the electronic data and details of the second repository associated with the second user, transferring the electronic data from the first repository to an intermediary, generating and applying a first identifier to the electronic data, collecting, a geolocation of a second endpoint device, wherein the second endpoint device is associated with the second repository, and wherein the geolocation is collected by a global positioning unit of the second endpoint device, transmitting the geolocation of the second endpoint device and a request for a verification of the geolocation of the second endpoint device to the first endpoint device, receiving, using the first endpoint device, the verification of the geolocation of the second endpoint device, generating and applying, as a result of the verification of the geolocation of the second endpoint device, a second identifier to the electronic data, transmitting control signals to the second endpoint device to prompt collection of self-directed image data, collecting, using the second endpoint device, the self-directed image data, wherein the self-directed image data comprises a timestamp, and storing, temporarily, the self-directed image data in a database.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
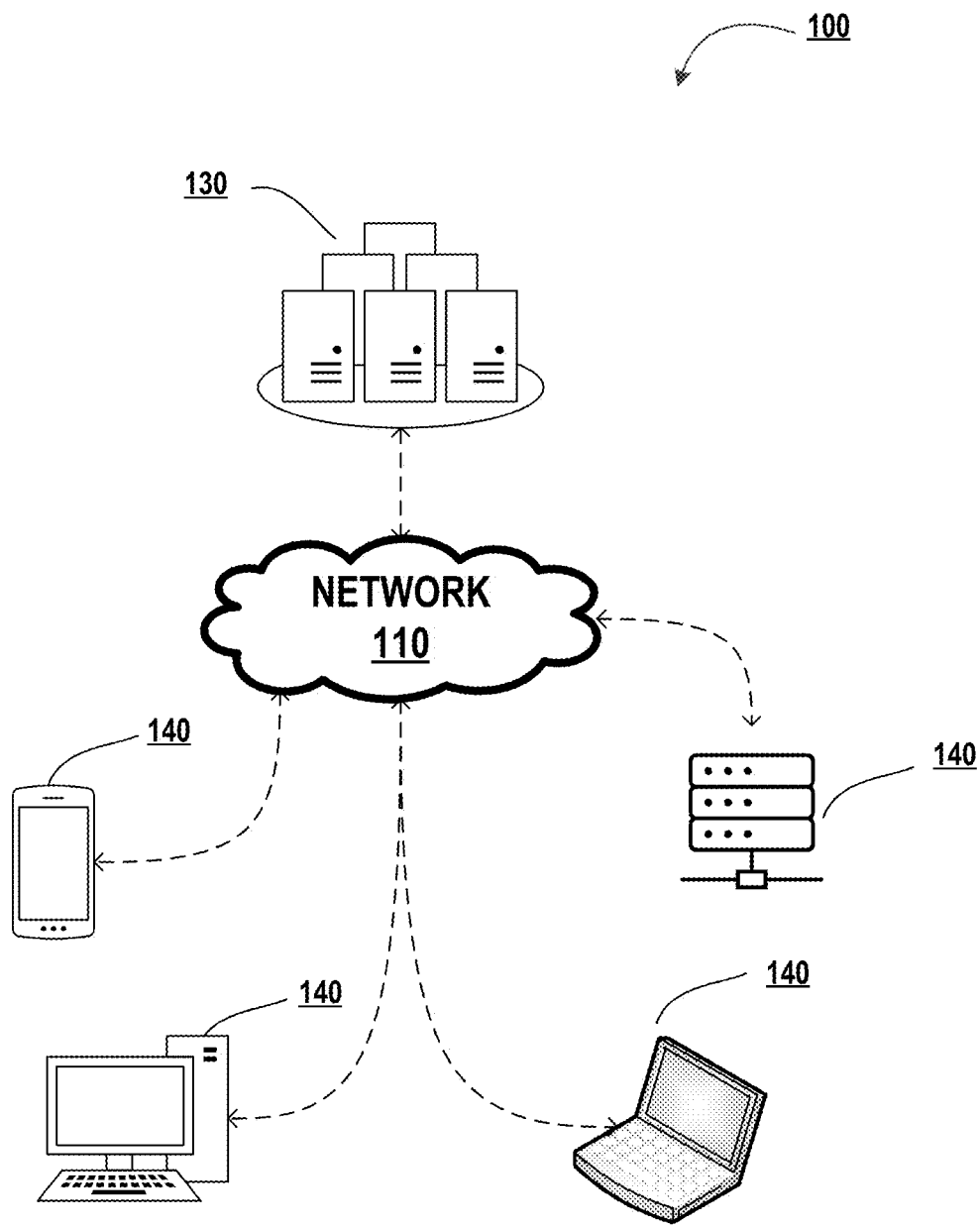
Figure 1C:
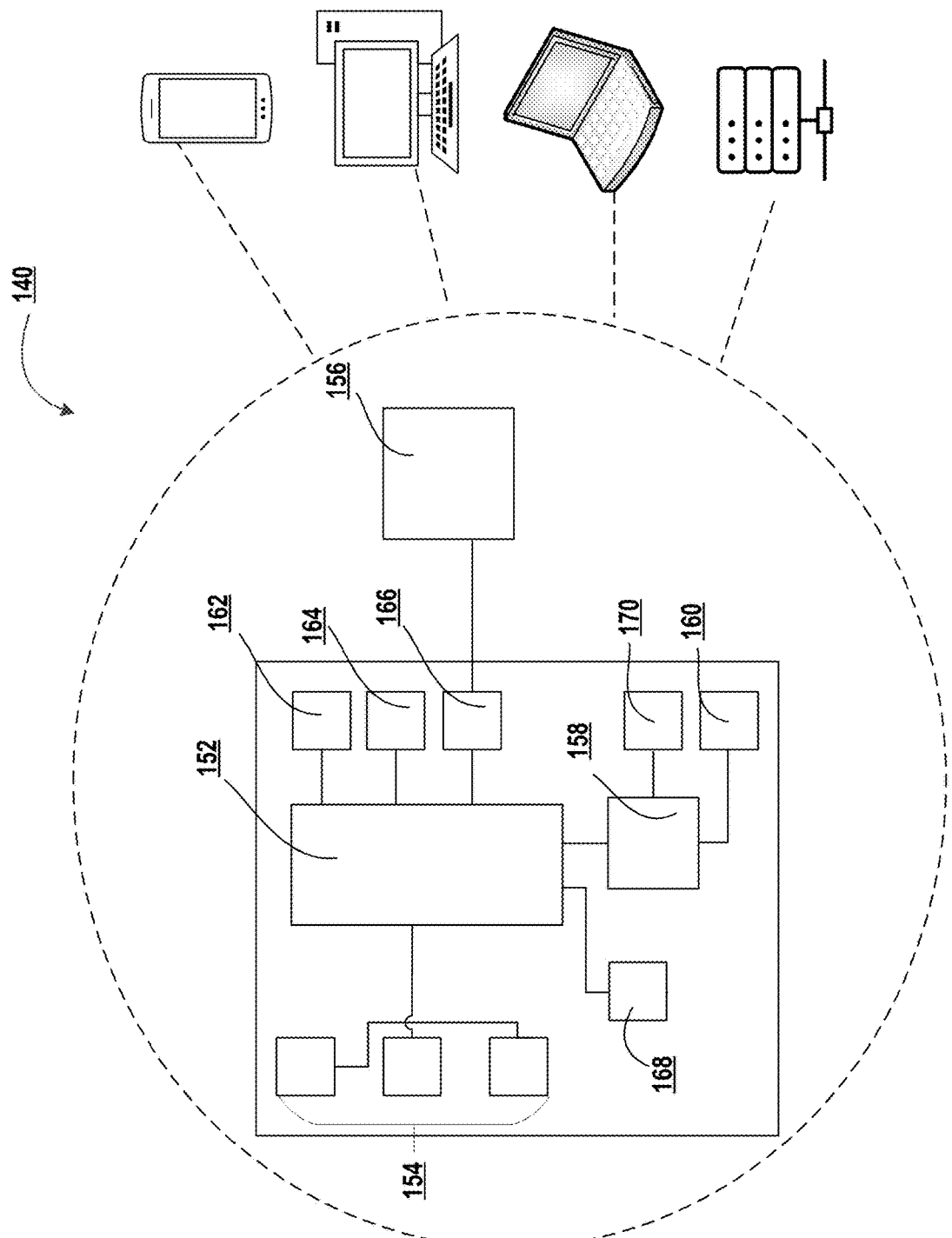
Figure 2:
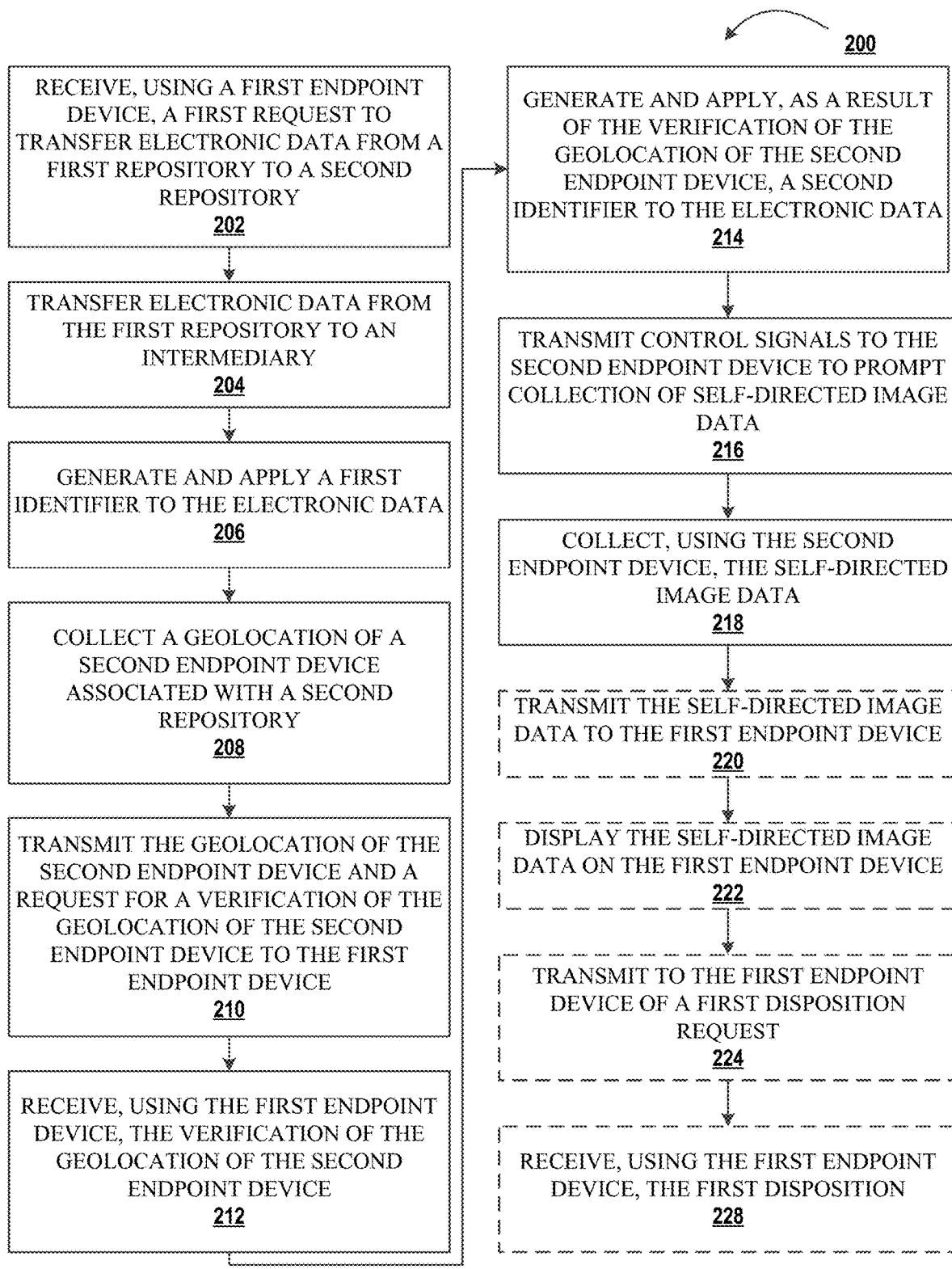
Figure 3:
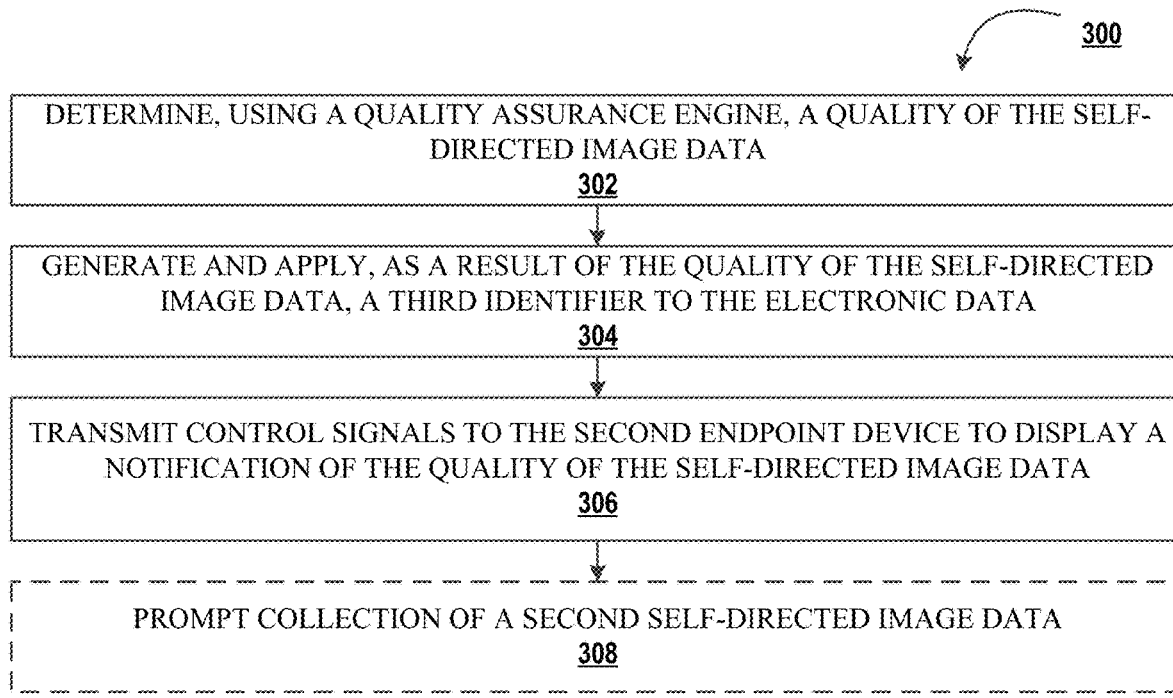
Figure 4:
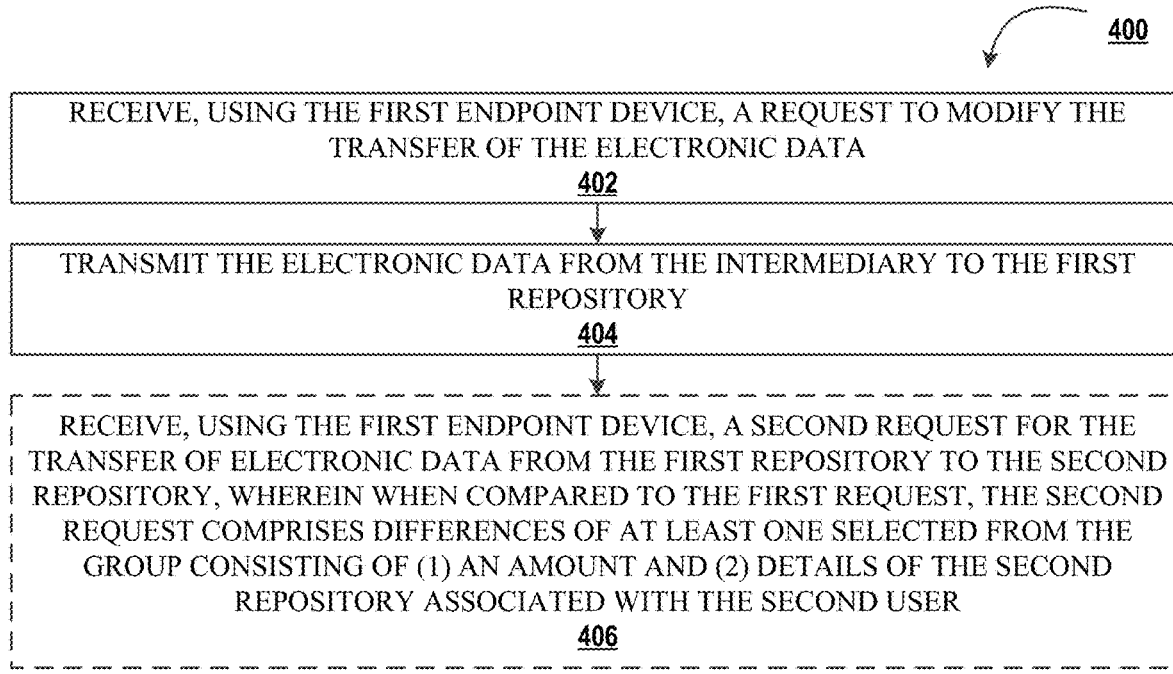
Figure 5:
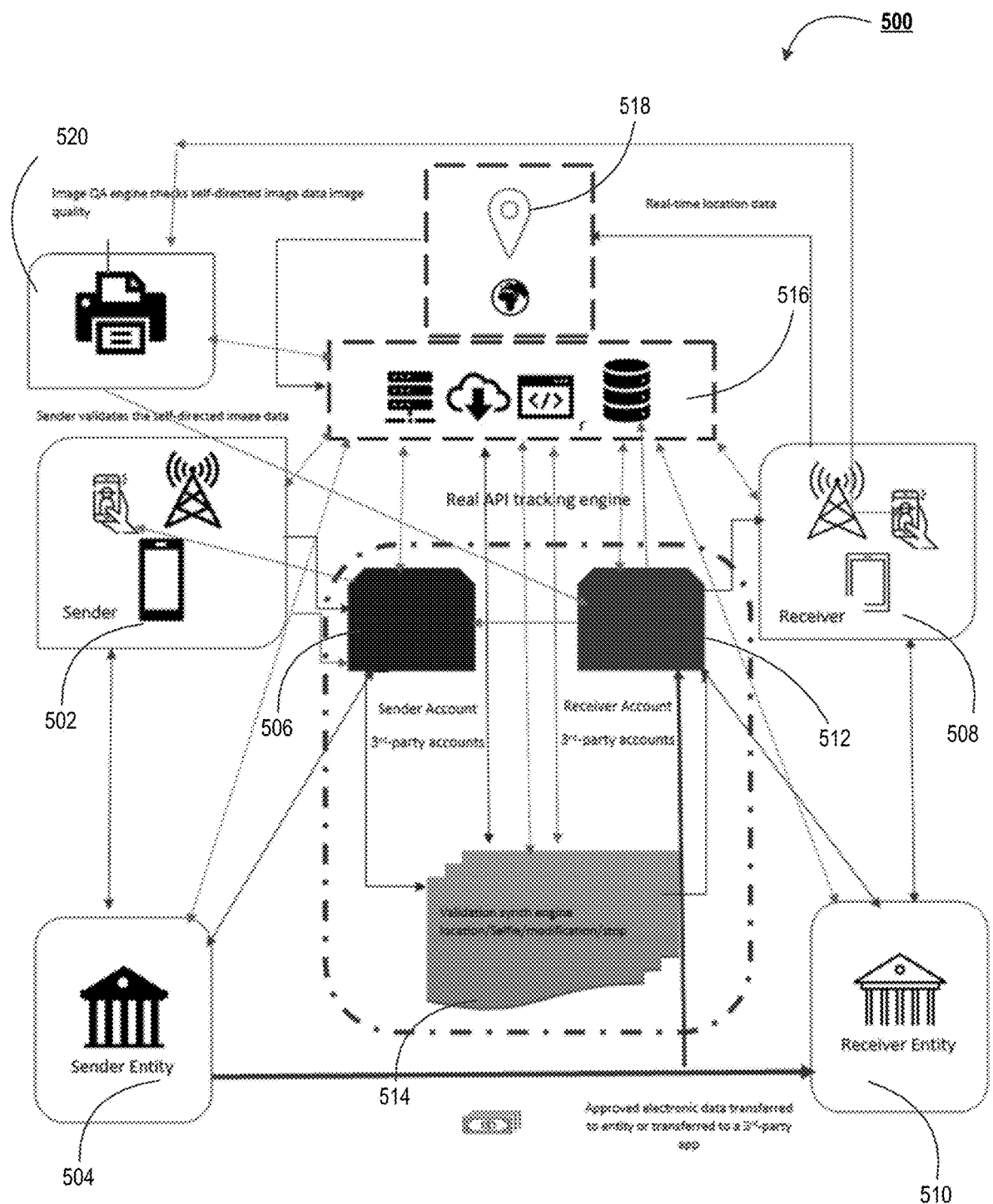

Having thus described embodiments of the invention in general terms, reference will now be made the accompanying drawings, wherein:

FIGS. 1A-1C illustrate technical components of an exemplary distributed computing environment for validation of electronic data transfers in a distributed network via self-directed image data, in accordance with an embodiment of the invention;

FIG. 2 illustrates a flow diagram for validation of electronic data transfers in a distributed network via self-directed image data, in accordance with an embodiment of the invention;

FIG. 3 illustrates a flow diagram for validation of electronic data transfers in a distributed network via self-directed image data, in accordance with an embodiment of the invention;

FIG. 4 illustrates a flow diagram for validation of electronic data transfers in a distributed network via self-directed image data, in accordance with an embodiment of the invention; and FIG. 5 illustrates a data flow graph for validation of electronic data transfers in a distributed network via self-directed image data, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the repository) and determine that the user has authority to access an repository or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" or "user interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, a transmission of a digital audio signal, or the like. As used herein, an "interacting user" may refer to a user who is engaging in the interaction, such as a caller to a helpdesk, a customer interacting with a digital assistant, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "electronic data" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a electronic data may be associated with one or more repositories or may be property that is not associated with a specific repository. Examples of electronic data associated with repositories may be repositories that have cash or cash equivalents, commodities, and/or repositories that are funded with or contain property, such as safety deposit boxes containing jewelry, art or other valuables, a trust repository that is funded with property, or the like. For purposes of this disclosure, a electronic data is typically stored in a electronic data repository—a storage location where one or more electronic data are organized, stored and retrieved electronically using a computing device.

As used herein, a "electronic data transfer," "transfer of electronic data" may refer to any transaction, activities or communication on electronic data between one or more entities, or between the user and the one or more entities. An electronic data transfer may refer to any transfer of electronically represented resources such as, but not limited to, a payment, processing of funds, purchase of goods or services, a return of goods or services, a payment transaction, a credit transaction, or other interactions involving a user's resource or repository. Unless specifically limited by the context, a "electronic data transfer" a "transaction", "transaction event" or "point of transaction event" may refer to any activity between a user, a merchant, an entity, or any combination thereof. In some embodiments, an electronic data transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between repositories, transactions with a financial institution teller, personal checks, conducting purchases using loyalty/rewards points etc. When discussing that electronic data transfers or transactions are evaluated, it could mean that the transaction has already occurred, is in the process of occurring or being processed, or that the transaction has yet to be processed/posted by one or more financial institutions. In some embodiments, an electronic data transfer or transaction may refer to non-financial activities of the user. In this regard, the transaction may be a customer repository event, such as but not limited to the customer changing a password, ordering new checks, adding new repositories, opening new repositories, adding or modifying repository parameters/restrictions, modifying a payee list associated with one or more repositories, setting up automatic payments, performing/modifying authentication procedures and/or credentials, and the like.

The technology described herein implements an approach to transfer electronic data from one repository to another while allowing for several checks and confirmations by the sender of the identity of the recipient. It also allows for the cancellation or modification of the transfer of electronic data at several points along the transfer process. Instead of sending electronic resources to a receiver that is identified only by a username, email, phone number, etc., the present method prevents typographical errors that lead to inadvertent transfer of electronic data to the incorrect recipient by prompting recipients for self-directed image data, geolocation, and other data that is then transferred to the sender prior to completing the electronic data transfer. The electronic data transfer method employed is designed in such a way that inadvertent electronic data transfers to incorrect recipients may be recalled or modified prior to the transfer of the electronic data from the first repository to the second repository. By leveraging this approach, the technology provides a robust and secure means of transferring electronic data.

Prior to the invention described herein, the state of technology in addressing inadvertent transfers of electronic data was inadequate. If a mistake was made by a sender of electronic data, there was very little, if anything, that the entity or service provider of the electronic data transfer could do to return the electronic data to the sender. Oftentimes, malfeasant actors were able to deceive senders by creating emails or usernames that appear very similar to others and receive electronic data as a result of the oversight of the sender(s). Moreover, if a malfeasant actor took control of the intended recipient's endpoint device, the malfeasant actor could subvert the electronic data to a repository other than that of the intended recipient. Even if the electronic data were able to be recalled from the recipient's repository, senders of electronic data would often remain unaware of the inadvertent transfer of electronic data until a much later date when the electronic data was no longer in the repository associated with the recipient.

The challenge lay in finding a way for senders of electronic data to keep track of and validate who was about to receive the electronic data at the time in which the electronic data was transferred. Moreover, there was a challenge in recalling electronic data transfers that contained incorrect recipient information or the amount of electronic data. For instance, if Person A intended to send X electronic data to Repository B, but instead accidentally sent Y electronic data to Repository C, it was difficult to effectively force a return of the X electronic data to Person A. This hindered the ability to accurately and efficiently transfer electronic resources between repositories.

The invention disclosed herein provides a technical solution. The solution described herein involves the application of identifiers to electronic data transfers at numerous points during the electronic data transfer process, such that users who are parties to the electronic data transfer are able to monitor, stop, or modify the electronic data transfer prior to the electronic data being permanently transferred from the sender's repository to the recipient's repository. The recipient, via the recipient's endpoint device, shares their location, self-directed image data, and a timestamp, which are transmitted to the sender's endpoint device during the electronic data transfer. This data is evaluated, both autonomously by the system and by the sender in order to ensure that the electronic data reaches the endpoint device of the intended recipient.

Accordingly, the present disclosure provides for the validation of electronic data transfers. A request is received for a transfer of electronic data from a first repository to a second repository. The electronic data is then transferred to an intermediary, where an identifier is generated and applied to the electronic data. The location of the second endpoint device is collected and transmitted to the first endpoint device, where a request for verification of the location is displayed. After the user of the first endpoint device verifies the location, another identifier is generated and applied to the electronic data. Thereafter, a request is sent to the second endpoint device for the collection of self-directed image data of the user of the second endpoint device. During collection of the self-directed image data, a timestamp is collected, and the image is stored. In some embodiments, the quality of the self-directed image data is evaluated by a quality assurance engine, which prompts the user of the second endpoint device to re-collect the self-directed image data if it is not of acceptable quality. If the self-directed image data is of acceptable quality, it is transmitted to the first endpoint device for displaying and subsequent viewing by the user at the first endpoint device. If the user at the first endpoint device approves the self-directed image data, the electronic data is transferred to the second repository. Otherwise, if not approved, it may be returned to the first repository. At any point during the process, a user such as the sender and/or the receiver is able to modify or terminate/cancel the electronic data transfer.

What is more, the present invention provides a technical solution to a technical problem. As described herein, the technical problem includes the inadvertent and untraceable transfer of electronic data to unintended repositories during electronic data transfers, caused by the oversight of a user or the ambiguity of recipient information. The lack of recourse for senders and the potential for malicious actors to redirect electronic data to unauthorized repositories further complicates the need for efficient and secure electronic data transfers. This challenge can be addressed by implementing a system and method that utilize self-directed image data for validation, ensuring intentional and accurate transfers. The technical solution presented herein facilitates the tracking of electronic data transfers through multiple steps of authentication, allowing for the approval, modification, or cancellation, of the electronic data transfer at each of these steps. This technical solution prevents the unwanted finality of electronic data transfers that are directed to the incorrect repositories. In particular, the system is an improvement over existing methods of returning mistakenly transferred electronic data by allowing for the detection of electronic data transferred to the incorrect repository (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment 100 for validation of electronic data transfers in a distributed network via self-directed image data, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and one or more storage devices 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the one or more storage devices 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the disclosure. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130, and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a flow diagram 200 for validation of electronic data transfers in a distributed network via self-directed image data, in accordance with an embodiment of the invention. As shown in block 202 the system 130 receives, using a first endpoint device 140, a request for a transfer of electronic data from a first repository associated with a first user to a second repository associated with a second user.

As used herein, a "repository" refers to an electronic storage mechanism to preserve, manage, and retrieve electronic data. The repository may leverage various encryption methods, security protocols, and database structures to facilitate and track transfers of electronic data from a repository to another repository, entity, or central bank.

An input to an endpoint device 140, such as through a user interface of the endpoint device 140, may indicate a request for the transfer of electronic data from a repository of the user associated with the first endpoint device 140 (i.e., a "first repository"), and which will be transmitted to, and received by, a repository associated with a user of the second endpoint device 140 (i.e., a "second repository").

In some embodiments, a request from the first endpoint device 140 will contain information regarding the requested electronic data transfer, such that the request comprises the amount of the transfer of the electronic data and details of the second repository (and/or second endpoint device 140) associated with the second user. The amount may include a currency or other numerical unit that corresponds to a proportion of the electronic data in the repository to be transferred. The details of the second repository (and/or second endpoint device 140) associated with the second user may include a phone number associated with the second repository or second endpoint device 140, a username or email address associated with the second repository or second endpoint device 140, an account number, a MAC address of the second endpoint device 140, IP address of the second endpoint device 140, a barcode or QR code, and so forth.

These details of the second repository (and/or second endpoint device 140) associated with the second user are generally either input into the first endpoint device 140 manually via the user interface of the first endpoint device 140 but may also be input via scanning of a barcode or QR code image displayed on the second endpoint device 140 or selection of an icon related to the second endpoint device 140 via the user interface of the first endpoint device 140.

The process may continue at block 204, where the system 130 transfers the electronic data from the first repository to an intermediary. As will be appreciated, the transferring of electronic data directly from the first repository to the second repository would circumvent the security measures described herein, and the electronic data received at the second repository may not be returnable to the first repository if the electronic data transfer was inadvertent.

Accordingly, an intermediary, such as a clearinghouse, may be a repository to retain the electronic data until a later time at which the electronic data is moved by the system 130 from the intermediary to either (a) the destination (i.e., the second repository), or back to (b) the source (i.e., the first repository). Prior to moving the electronic data, the repository waits for instructions from the system 130, as the system 130 abides by standardized rules, procedures, and protocols for centralizing the clearing and settlement of electronic data transfers.

In some embodiments, prior to transferring the electronic data from the first repository, the electronic data may be transformed from an unstructured format into a structured format. The transformation of electronic data from an unstructured format to a structured format involves parsing and formatting into a structured schema or model, which can use data normalization, standardization, or the application of predefined rules and taxonomies. This structured format facilitates efficient storage, indexing, and querying of data, enabling improved data integration, analysis, and decision-making capabilities.

Next, as shown in block 206 the system 130 may generate and apply a first identifier to the electronic data. Identifiers, as will be used throughout the process described here, are generated alphanumeric text strings that are generated by the system 130. The identifiers provide traceability of the electronic data throughout several steps of the process flow for the transfer between the first and second repositories, in order for the first and/or second users to determine if the electronic data has been transferred from the first repository to the second repository, or if it is still in-process such that the first and/or second user may modify or amend the transfer of electronic data, as will be discussed herein with respect to FIG. 4.

For example, when the electronic data is transferred from the first repository to the intermediary, a first identifier is generated and applied to the electronic data. It may be provided, by a primary tracking engine of the system 130, to an identifier database that references both the electronic data and the first identifier. The identifier database may have entry locations for a plurality of identifiers for each electronic data. As the process moves along, an identifier is generated that the primary tracking engine recognizes to be associated with a particular step of the process, which can in turn be communicated to the first user, second user, or other third parties through an API. Thus, a first and/or second user can view the user interface of an endpoint device 140 and determine the process steps undertaken thus far, or current process step in which the electronic data is associated. The identifiers have a predetermined number of characters, and predetermined characters unique to each of the process steps may be applied as part of the identifier. Other portions of the identifier may be generated randomly or according to a numbering algorithm predefined in the system 130. The first identifier, as generated in block 206, indicates the transferring of electronic data from the first repository to the second repository.

The process may continue at block 208, where the system 130 collects a geolocation of the second endpoint device 140, using a geolocation module of the second endpoint device 140. The geolocation may be collected by a geolocation module of the second endpoint device 140, such as a global positioning unit (GPS) of the second endpoint device 140. Alternatively, or additionally, the geolocation may be determined through cellular network triangulation or by utilizing Wi-Fi signals and their corresponding signal strength in relation to known access points.

The geolocation of the second endpoint device 140 is data that may be transferred to the first endpoint device 140, such that a user associated with the first endpoint device 140 may view the geolocation of the second endpoint device 140 and determine whether the geolocation is that which was expected by the user of the first endpoint device 140. For example, the user associated with the first endpoint device 140 (hereinafter referred to as the "first user") may wish to transfer electronic data from the first repository to the second repository only if the first user confirms that the second endpoint device 140 (and by association, the user associated with the second endpoint device 140, or "second user") is located in a geographic area that is expected by the first user. Should the second endpoint device 140 be determined by the geolocation module to be located on the western coast of the United States, and the first user expects the second endpoint device 140 to be located on the eastern coast of the United States, it may indicate to the first user that the details of the second repository (and/or second endpoint device 140), input into the first endpoint device 140 in block 202, were incorrect.

Accordingly, and as shown in block 210 the system 130 may then transmit the geolocation of the second endpoint device 140, and a request for a verification thereof, to the first endpoint device 140. The geolocation may be displayed on the user interface of the first endpoint device 140 as "[City], [State], [Country]" format, display GPS coordinates, or provide an illustrated map of the location of the second endpoint device 140, such as to convey the geolocation to the first user. The first user may then be presented with one or more buttons or icons on the user interface, such as "approve" and "deny" buttons.

Upon approval (i.e., by the first user pressing the "approve" button), the process may continue at block 212, where the system 130 receives from the first endpoint device 140 the verification (i.e., the signal generated as a result of the approval) of the geolocation of the second endpoint device 140. However, if the geolocation is denied instead of approved (i.e., by the first user pressing the "deny" button), the electronic data may be automatically returned to the first repository.

After receiving the verification of the geolocation, as shown in block 214, the system 130 may generate a second identifier, to record and track the verification of the geolocation of the second endpoint device 140. The second identifier may be subsequently appended to the reference to the electronic data in the identifier database by the primary tracking engine.

Next, as illustrated by block 216, the system 130 may transmit control signals to the second endpoint device 140 to prompt collection of self-directed image data. Self-directed image data is the data containing a photograph that a user takes of oneself (known colloquially as a "selfie"). This self-directed image data is valuable in that, the second endpoint device 140 collects a self-directed image of the user associated with the second endpoint device 140 (i.e., the "second user"), the user associated with the first endpoint device 140 (i.e., the "first user") can visually inspect the self-directed image data to verify if the second user is the recipient intended by the first user or not. Thus, at block 216, the system 130 provides a prompt to the second endpoint device 140 for the second user to initiate the collection of the self-directed image data. This prompt may be displayed on the user interface of the second endpoint device 140 and display as an icon or button to allow the second user to begin the collection of the self-directed image data.

After the second user is prompted on the second endpoint device 140, and the second user accepts the prompt, the process may continue at block 218 where the system 130 collects, using the second endpoint device 140, the self-directed image data. This data collection involves accessing the camera or image capture device of the second endpoint device 140 to capture the desired image. Once the second user confirms readiness, the system 130 initiates the image capture process, which involves capturing a single image or a sequence of images. The collected self-directed image data is then transmitted to the system 130 for further processing and analysis.

The self-directed image data may take numerous formats, including but not limited to JPEG, PNG, TIFF, BMP, and GIF. These formats represent common image file types that are widely supported across various platforms and devices. Additionally, or alternatively, the self-directed image data can also be represented in raw image formats such as RAW or DNG.

In some embodiments, the self-directed image data contains a timestamp. The inclusion of a timestamp provides temporal information regarding when the self-directed image data was captured. This timestamp is typically generated by the second endpoint device 140 based on its internal clock and is associated with the self-directed image data via metadata, such that applications and systems utilizing the image can establish temporal relationships, track events, and facilitate chronological organization. In some embodiments, the timestamp is checked by the quality assurance engine that will be described with respect to FIG. 3.

Although not depicted graphically, the system 130 may store, temporarily, the self-directed image data in a database.

Moreover, in some embodiments, either prior to or immediately following the collection of the self-directed image data, the system 130 may prompt the second endpoint device 140 to collect one or more authentication credentials of the second user, including, but not limited to, a fingerprint, retinal scan, facial recognition, passcode entry, palm scanning, and so forth. In doing so, the system 130 ensures another level of confirmation that the second user is the person in possession of the second endpoint device 140. Accordingly, the system 130 may require that the authentication credentials match the stored authentication credentials of the second user prior to continuing with the remainder of process flow.

Turning now to FIG. 3, FIG. 3 illustrates a flow diagram 300 for validation of electronic data transfers in a distributed network via self-directed image data, in accordance with an embodiment of the invention. The process outlined with respect to FIG. 3 is directed to a quality assurance protocol that is initiated in some embodiments to evaluate the quality of the self-directed image obtained at block 218.

As shown in block 302 the system 130 may first determine, using a quality assurance engine, a quality of the self-directed image data. To begin the quality assessment, the self-directed image data is provided to the quality assurance engine, which comprises a set of computational models and methodologies designed to evaluate image quality using a machine learning algorithm.

The system 130 examines various aspects of the self-directed image data, such as sharpness, clarity, noise levels, and/or resolution. This analysis involves providing the self-directed image data to a machine learning algorithm. The algorithm is trained on a large dataset of labeled images, enabling it to understand and quantify image quality based on the learned patterns. During training, the machine learning algorithm learns from examples of high-quality and low-quality images, capturing the characteristics that differentiate them. These examples serve as a reference for the algorithm to evaluate self-directed image data.

The machine learning algorithm compares the self-directed image data with patterns learned during training. It compares features of the self-directed image data to predefined quality standards, reference images, or statistical models established through prior training. This allows the algorithm to assess how closely the image data aligns with the expected quality levels.

Based on these comparisons and evaluations, the machine learning algorithm generates a quality score estimating of the image quality. It can take the form of a single value, a range, or a rating scale, indicating the quality level of the self-directed image data. A predetermined threshold is set which the score is compared to. The quality of the self-directed image is considered deficient if it is below the predefined threshold, and satisfactory if it is above the predefined threshold.

To continually improve performance and adapt to various scenarios, the machine learning algorithm can undergo continuous learning and adaptation. This may involve periodically updating the algorithm with new training data to capture evolving trends and visual preferences. Additionally, the system 130 can incorporate user feedback or employ reinforcement learning techniques to enhance the algorithm's quality assessment capabilities.

In some embodiments, the quality assurance engine evaluates the timestamp of the self-directed image data. If the timestamp is more than a predetermined length of time prior to the time at which the quality assurance engine is evaluating it, the quality of the self-directed image is considered deficient. On the other hand, if the timestamp is less than a predetermined length of time prior to the time at which the quality assurance engine is evaluating it, the quality of the self-directed image is considered satisfactory. In other words, the acceptability of the self-directed image data times out.

As shown in block 304 the system 130 may generate and apply, as a result of the quality of the self-directed image data, a third identifier to the electronic data. As previously described, identifiers are associated with the electronic data in an identifier database at several steps during the process. Accordingly, as a result of a quality of the self-directed image data being determined (either satisfactory or deficient), a third identifier is generated in the same manner as the first and second identifiers, and this third identifier is associated with the electronic data, first identifier, and second identifier in the identifier database.

As shown in block 306, the system 130 may transmit control signals to the second endpoint device 140 for displaying a notification regarding the quality of the self-directed image data. This functionality ensures that second users receive prompt feedback regarding the quality of their collected self-directed image data and an opportunity to repeat the collection When the quality of the self-directed image data is determined by the quality assurance engine to be deficient, the system 130 generates control signals to display a rejection notification on the second endpoint device 140, as depicted in block 308. The rejection notification alerts the user that the quality of the captured image is below the desired or predefined standards. Along with the rejection notification, the control signals may prompt the collection of a second self-directed image data, allowing the user to make necessary adjustments or retake the self-directed image.

Alternatively, if the quality assurance engine deems the self-directed image data to be satisfactory, the system 130 generates control signals to display a confirmation notification on the second endpoint device 140. This confirmation notification informs the user that the captured image meets the desired or predefined standards.

Returning to FIG. 2, as shown in block 220, the system 130 may then transmit the self-directed image data to the first endpoint device 140. The data may be encoded into a compressed format, packaged into packets with sequence numbers and error detection codes, and sent over the network using a suitable protocol. Error detection and correction techniques ensure data integrity during transfer. Upon reaching the first endpoint device 140, the packets are decoded, reconstructing the original image data for display or further processing.

As shown in block 222, the system 130 may then display the self-directed image data on the first endpoint device 140. The endpoint device 140 utilizes its built-in display hardware and software to render the image based on the received self-directed image data. The rendering process involves converting the digital image information into appropriate pixel values and applying any necessary image processing techniques, such as color correction or resizing, to optimize the visual output. Finally, the rendered image is displayed on the screen of the first endpoint device 140, allowing the user to view the self-directed image data.

In some embodiments, the timestamp of the self-directed image data may be displayed on the first endpoint device 140, such that the first user may review the timestamp and assess if the timestamp occurred within a time period acceptable to the first user.

Next, the process may continue at block 224, where the system 130 transmits, to the first endpoint device 140, a request for a first disposition. The system 130 generates a notification based on a template or dynamic parameters to receive from the first user at the endpoint device 140 the first disposition, which will give the first user the choice between proceeding with the electronic data transfer, or to not proceed to the electronic data transfer. The request for the first disposition establishes a connection with the device using a communication protocol and transmits a prepared notification data. The first endpoint device 140 presents the notification to the user for their response. The notification contains a request for a first disposition, which can be provided as one or two icons or buttons displayed on the user interface of the first endpoint device 140. One icon may indicate an affirmation of the self-directed image data by the user associated with the first endpoint device 140, while another may indicate the rejection of the self-directed image data by the user associated with the first endpoint device 140.

In some embodiments, the request for the first disposition also contains an icon or button to initiate a request by the first user for another self-directed image data of the second user, which may occur when the self-directed image data of the second user is unrecognizable to the first user. Upon indication of a request for another self-directed image data, the process may start over at block 216.

As shown in block 226 the system 130 then receives, using the first endpoint device 140, the first disposition. The first disposition is a response to the disposition request, the result of which will change the flow of electronic data. Upon indication of an affirmation by user interaction with an icon, the electronic data may be transferred from the intermediary to the second repository. However, upon indication of a rejection of the self-directed image data by user interaction with an icon, the electronic data is transferred from the intermediary to the first repository, in essence cancelling the electronic data transfer.

FIG. 4 illustrates a flow diagram 400 for validation of electronic data transfers in a distributed network via self-directed image data, in accordance with an embodiment of the invention. As shown in block 402 the system 130 receives a request using the first endpoint device 140 to modify the transfer of the electronic data.

As previously described, the electronic data transfer is associated with identifiers at several of the process steps, for example the first identifier, second identifier, and third identifier. Accordingly, via the first endpoint device 140 or the second endpoint device 140, the first user and/or the second user may view a status of the process of the electronic data transfer, such as pending (in the intermediary), approved geolocation, or pending acceptance by the first user of the self-directed image data, etc.

As a result of viewing the point at which the electronic data transfer has been processed, the first user or second user may determine that a particular aspect of the electronic data transfer should be altered. Accordingly, using an API call, users may exert control over the electronic data transfer process, enabling them to pause, reverse, amend, or otherwise modify the electronic data transfer. The nature of the alterations requested through the API call can vary and may include parameters such as the amount of electronic data and destination of the electronic data.

In order to process such modifications of the electronic data transfer, the electronic data is returned from the intermediary to the first repository such as to re-start the process over again from block 202. Accordingly, in block 404 the system 130 transmits the electronic data from the intermediary to the first repository.

Next, as shown in block 406, the system 130 may receive, using the first endpoint device 140, a second request for the transfer of electronic data from the first repository to the second repository. The step shown in block 406 is analogous to that which was performed in block 202, however, when compared to the request from block 202 (i.e., the original request), the second request for the transfer of electronic data contains differences of at least one of (i) the amount of the transfer of the electronic data (i.e., the quantitative amount to be transferred from the first repository to the second repository) and (ii) details of the second repository, which may be details associated with the second user themselves, such details including: an email address, username, account number, phone number, name, or other identifying information associated with the second endpoint device 140, second repository, and/or the second user.

FIG. 5 illustrates a data flow graph 500 for validation of electronic data transfers in a distributed network via self-directed image data, in accordance with an embodiment of the invention. The first endpoint device 502 is operatively coupled to the entity associated with the first endpoint device 504, which is operatively coupled to the repository associated with a user or entity of the first endpoint device 506. Similarly, the second endpoint device 508 is operatively coupled to the entity associated with the second endpoint device 510, which is operatively coupled to the repository associated with the user or entity of the second endpoint device 512. The second endpoint device 508 contains a geolocation module 518 to determine the geolocation of the second endpoint device. The validation sync engine 514 and real API tracking engine 516 execute various functions of the system 130 described herein, including the quality assurance engine 520.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for validation of electronic data transfers in a distributed network via self-directed image data, the system comprising:
   a processing device; and
   a non-transitory storage device comprising instructions that, when executed by the processing device, causes the processing device to perform the steps of:
   receive, using a first endpoint device, a first request for a transfer of electronic data from a first repository associated with a first user to a second repository associated with a second user, wherein the first request comprises an amount of the transfer of the electronic data and details of the second repository associated with the second user;
   transfer the electronic data from the first repository to an intermediary;
   generate and apply a first identifier to the electronic data;
   collect, a geolocation of a second endpoint device, wherein the second endpoint device is associated with the second repository, and wherein the geolocation is collected by a global positioning unit of the second endpoint device;
   transmit the geolocation of the second endpoint device and a request for a verification of the geolocation of the second endpoint device to the first endpoint device;
   receive, using the first endpoint device, the verification of the geolocation of the second endpoint device;

generate and apply, as a result of the verification of the geolocation of the second endpoint device, a second identifier to the electronic data;

transmit control signals to the second endpoint device to prompt collection of self-directed image data;

collect, using the second endpoint device, the self-directed image data, wherein the self-directed image data comprises a timestamp; and store, temporarily, the self-directed image data in a database.

2. The system of claim 1, wherein the instructions, when executed by the processing device, further causes the processing device to perform the steps of:

determine, using a quality assurance engine, a quality of the self-directed image data;

generate and apply, as a result of the quality of the self-directed image data, a third identifier to the electronic data; and transmit control signals to the second endpoint device to display a notification of the quality of the self-directed image data, wherein the notification comprises a rejection when the quality of the self-directed image data is deficient and control signals to prompt collection of a second self-directed image data, and wherein the notification comprises a confirmation when the quality of the self-directed image data is deficient.

3. The system of claim 1, wherein the instructions, when executed by the processing device, further causes the processing device to perform the steps of:

transmit the self-directed image data to the first endpoint device;

display the self-directed image data on the first endpoint device;

transmit, to the first endpoint device, a request for a first disposition; and receive, using the first endpoint device, the first disposition.

4. The system of claim 3, wherein when the first disposition comprises an affirmation of the self-directed image data, the electronic data is transferred from the intermediary to the second repository.

5. The system of claim 3, wherein when the first disposition comprises a rejection of the self-directed image data, the electronic data is transferred from the intermediary to the first repository.

6. The system of claim 1, wherein the instructions, when executed by the processing device, further causes the processing device to perform the steps of:

receive, using the first endpoint device, a request to modify the transfer of the electronic data; and transmit the electronic data from the intermediary to the first repository.

7. The system of claim 6, wherein the instructions, when executed by the processing device, further causes the processing device to perform the steps of:

receive, using the first endpoint device, a second request for the transfer of electronic data from the first repository to the second repository, wherein when compared to the first request, the second request comprises differences of at least one selected from the group consisting of (1) the amount of the transfer of the electronic data and (2) details of the second repository associated with the second user.

8. A computer program product for validation of electronic data transfers in a distributed network via self-directed image data, the computer program product comprising a non-transitory computer-readable medium comprising code causing an apparatus to:

receive, using a first endpoint device, a first request for a transfer of electronic data from a first repository associated with a first user to a second repository associated with a second user, wherein the first request comprises an amount of the transfer of the electronic data and details of the second repository associated with the second user;

transfer the electronic data from the first repository to an intermediary;

generate and apply a first identifier to the electronic data;

collect, a geolocation of a second endpoint device, wherein the second endpoint device is associated with the second repository, and wherein the geolocation is collected by a global positioning unit of the second endpoint device;

transmit the geolocation of the second endpoint device and a request for a verification of the geolocation of the second endpoint device to the first endpoint device;

receive, using the first endpoint device, the verification of the geolocation of the second endpoint device;

generate and apply, as a result of the verification of the geolocation of the second endpoint device, a second identifier to the electronic data;

transmit control signals to the second endpoint device to prompt collection of self-directed image data;

collect, using the second endpoint device, the self-directed image data, wherein the self-directed image data comprises a timestamp; and store, temporarily, the self-directed image data in a database.

9. The computer program product of claim 8, wherein the code further causes the apparatus to:

determine, using a quality assurance engine, a quality of the self-directed image data;

generate and apply, as a result of the quality of the self-directed image data, a third identifier to the electronic data; and transmit control signals to the second endpoint device to display a notification of the quality of the self-directed image data, wherein the notification comprises a rejection when the quality of the self-directed image data is deficient and control signals to prompt collection of a second self-directed image data, and wherein the notification comprises a confirmation when the quality of the self-directed image data is deficient.

10. The computer program product of claim 8, wherein the code further causes the apparatus to:

transmit the self-directed image data to the first endpoint device;

display the self-directed image data on the first endpoint device;

transmit, to the first endpoint device, a request for a first disposition; and receive, using the first endpoint device, the first disposition.

11. The computer program product of claim 10, wherein when the first disposition comprises an affirmation of the self-directed image data, the electronic data is transferred from the intermediary to the second repository.

12. The computer program product of claim 10, wherein when the first disposition comprises a rejection of the self-directed image data, the electronic data is transferred from the intermediary to the first repository.

13. The computer program product of claim 8, wherein the code further causes the apparatus to:

receive, using the first endpoint device, a request to modify the transfer of the electronic data; and transmit the electronic data from the intermediary to the first repository.

14. The computer program product of claim 13, wherein the code further causes the apparatus to:

receive, using the first endpoint device, a second request for the transfer of electronic data from the first repository to the second repository, wherein when compared to the first request, the second request comprises differences of at least one selected from the group consisting of (1) the amount of the transfer of the electronic data and (2) details of the second repository associated with the second user.

15. A method for validation of electronic data transfers in a distributed network via self-directed image data, the method comprising:

receiving, using a first endpoint device, a first request for a transfer of electronic data from a first repository associated with a first user to a second repository associated with a second user, wherein the first request comprises an amount of the transfer of the electronic data and details of the second repository associated with the second user;

transferring the electronic data from the first repository to an intermediary;

generate and apply a first identifier to the electronic data;

collecting, a geolocation of a second endpoint device, wherein the second endpoint device is associated with the second repository, and wherein the geolocation is collected by a global positioning unit of the second endpoint device;

transmitting the geolocation of the second endpoint device and a request for a verification of the geolocation of the second endpoint device to the first endpoint device;

receiving, using the first endpoint device, the verification of the geolocation of the second endpoint device;

generating and applying, as a result of the verification of the geolocation of the second endpoint device, a second identifier to the electronic data;

transmitting control signals to the second endpoint device to prompt collection of self-directed image data;

collecting, using the second endpoint device, the self-directed image data, wherein the self-directed image data comprises a timestamp; and storing, temporarily, the self-directed image data in a database.

16. The method of claim 15, wherein the method further comprises:

determining, using a quality assurance engine, a quality of the self-directed image data;

generating and applying, as a result of the quality of the self-directed image data, a third identifier to the electronic data; and transmitting control signals to the second endpoint device to display a notification of the quality of the self-directed image data, wherein the notification comprises a rejection when the quality of the self-directed image data is deficient and control signals to prompt collection of a second self-directed image data, and wherein the notification comprises a confirmation when the quality of the self-directed image data is deficient.

17. The method of claim 15, wherein the method further comprises:

transmitting the self-directed image data to the first endpoint device;

displaying the self-directed image data on the first endpoint device;

transmitting, to the first endpoint device, a request for a first disposition; and receiving, using the first endpoint device, the first disposition.

18. The method of claim 17, wherein when the first disposition comprises a rejection of the self-directed image data, the electronic data is transferred from the intermediary to the first repository.

19. The method of claim 15, wherein the method further comprises:

receiving, using the first endpoint device, a request to modify the transfer of the electronic data; and transmitting the electronic data from the intermediary to the first repository.

20. The method of claim 19, wherein the method further comprises:

receiving, using the first endpoint device, a second request for the transfer of electronic data from the first repository to the second repository, wherein when compared to the first request, the second request comprises differences of at least one selected from the group consisting of (1) the amount of the transfer of the electronic data and (2) details of the second repository associated with the second user.

* * * * *